United States Patent
Andersen et al.

(10) Patent No.: US 8,263,032 B2
(45) Date of Patent: Sep. 11, 2012

(54) OXIDATION CATALYST

(75) Inventors: Paul Joseph Andersen, Plymouth Meeting, PA (US); Todd Ballinger, Downingtown, PA (US); David Bergeal, Ware (GB); Hsiao-Lan Chang, Wayne, PA (US); Hai-Ying Chen, Conshohocken, PA (US); Julian Cox, Malvern, PA (US); Ralf Dotzel, Nuernberg (DE); Rainer Leppelt, Lichtenfels (DE); Jörg Werner Münch, Lichtenfels (DE); Hubert Schedel, Küps (DE); Duncan John William Winterborn, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/384,568

(22) PCT Filed: Feb. 1, 2011

(86) PCT No.: PCT/GB2011/050160
§ 371 (c)(1),
(2), (4) Date: Jan. 17, 2012

(87) PCT Pub. No.: WO2011/092519
PCT Pub. Date: Aug. 4, 2011

(65) Prior Publication Data
US 2012/0122660 A1    May 17, 2012

Related U.S. Application Data

(60) Provisional application No. 61/300,279, filed on Feb. 1, 2010.

(51) Int. Cl.
*B01D 53/94*    (2006.01)
*B01J 29/00*    (2006.01)
*B01J 35/00*    (2006.01)
*B01J 35/04*    (2006.01)
*F01N 3/10*    (2006.01)
*F01N 3/28*    (2006.01)

(52) U.S. Cl. ............... 423/213.2; 423/213.5; 423/245.3; 423/247; 502/300; 502/304; 502/325; 502/324; 502/344; 502/353; 502/302; 60/299; 60/301; 55/524; 55/523; 55/DIG. 30; 95/285

(58) Field of Classification Search ............... 502/300, 502/304, 325, 324, 344, 353, 302; 423/213.2, 423/213.5, 245.3, 247; 60/299, 301; 55/DIG. 30, 55/524, 523; 95/285
See application file for complete search history.

(56) References Cited

U.S. PATENT DOCUMENTS
4,510,261 A    4/1985    Pereira et al.
(Continued)

FOREIGN PATENT DOCUMENTS
EP    0 756 891 A1    2/1997
(Continued)

OTHER PUBLICATIONS
Ido et al., "Fundamental Study and Possible Application of New Concept Honeycomb Substrate for Emission Control," *SAE Technical Paper Series*, Paper No. 2007-01-0658, Copyright © 2007 SAE International.
(Continued)

*Primary Examiner* — Timothy Vanoy
(74) *Attorney, Agent, or Firm* — RatnerPrestia

(57) ABSTRACT

An oxidation catalyst comprises an extruded solid body comprising: 10-95% by weight of at least one binder/matrix component; 5-90% by weight of a zeolitic molecular sieve, a non-zeolitic molecular sieve or a mixture of any two or more thereof; and 0-80% by weight optionally stabilized ceria, which catalyst comprising at least one precious metal and optionally at least one non-precious metal, wherein: (i) a majority of the at least one precious metal is located at a surface of the extruded solid body; (ii) the at least one precious metal is carried in one or more coating layer(s) on a surface; (iii) at least one metal is present throughout the extruded solid body and in a higher concentration at a surface; (iv) at least one metal is present throughout the extruded solid body and in a coating layer(s) on a surface; or (v) a combination of (ii) and (iii).

20 Claims, 6 Drawing Sheets

U.S. PATENT DOCUMENTS

| | | | |
|---|---|---|---|
| 5,552,128 | A | 9/1996 | Chang et al. |
| 5,589,147 | A | 12/1996 | Farnos et al. |
| 5,772,972 | A | 6/1998 | Hepburn et al. |
| 6,110,862 | A | 8/2000 | Chen et al. |
| 6,248,684 | B1 | 6/2001 | Yavuz et al. |
| 6,432,859 | B1 | 8/2002 | Iwakuni et al. |
| 6,488,903 | B2 | 12/2002 | Mathes et al. |
| 6,780,805 | B2 | 8/2004 | Faber et al. |
| 7,507,684 | B2 | 3/2009 | Hofmann et al. |
| 2002/0051742 | A1 | 5/2002 | Hotta et al. |
| 2002/0077247 | A1 | 6/2002 | Bender et al. |
| 2002/0140138 | A1 | 10/2002 | Wu et al. |
| 2002/0183191 | A1 | 12/2002 | Faber et al. |
| 2003/0224933 | A1 | 12/2003 | Kondo et al. |
| 2006/0179825 | A1 | 8/2006 | Hu et al. |
| 2007/0012028 | A1 | 1/2007 | Weissman et al. |
| 2007/0014710 | A1 | 1/2007 | Gerlach et al. |
| 2007/0134145 | A1 | 6/2007 | Strehlau et al. |
| 2007/0259770 | A1 | 11/2007 | Hofmann et al. |
| 2008/0069743 | A1 | 3/2008 | Castellano et al. |
| 2009/0143221 | A1 | 6/2009 | Ogunwumi et al. |
| 2009/0196813 | A1 | 8/2009 | Sobolevskiy et al. |
| 2010/0034717 | A1 | 2/2010 | Adelmann et al. |
| 2010/0222205 | A1 | 9/2010 | Ogunwumi et al. |
| 2010/0290963 | A1 | 11/2010 | Andersen et al. |
| 2010/0295218 | A1 | 11/2010 | Dotzel et al. |
| 2010/0296992 | A1 | 11/2010 | Jiang et al. |
| 2011/0021856 | A1* | 1/2011 | Lai et al. .................. 585/467 |

FOREIGN PATENT DOCUMENTS

| | | |
|---|---|---|
| EP | 0 801 972 A1 | 10/1997 |
| EP | 1 338 322 A1 | 8/2003 |
| EP | 1 493 484 A1 | 1/2005 |
| EP | 1 739 066 A1 | 1/2007 |
| EP | 1 837 063 A1 | 9/2007 |
| EP | 2 105 589 A1 | 9/2009 |
| EP | 2 123 354 A1 | 11/2009 |
| EP | 2 130 589 A2 | 12/2009 |
| EP | 2 130 603 A2 | 12/2009 |
| EP | 2 130 605 A2 | 12/2009 |
| GB | 2 450 484 A | 12/2008 |
| JP | 63-72342 A | 4/1988 |
| JP | 2010-497 A | 1/2010 |
| JP | 2010-499 A | 1/2010 |
| WO | WO-99/47260 A1 | 9/1999 |
| WO | WO-2006/093802 A2 | 9/2006 |
| WO | WO-2008/049491 A1 | 3/2008 |
| WO | WO-2008/132452 A2 | 11/2008 |
| WO | WO-2008/154739 A1 | 12/2008 |
| WO | WO-2009/001131 A1 | 12/2008 |
| WO | WO-2009/080155 A1 | 7/2009 |
| WO | WO-2009/093071 A1 | 7/2009 |
| WO | WO-2010/099288 A2 | 9/2010 |
| WO | WO-2010/099395 A1 | 9/2010 |
| WO | WO-2011/026573 A1 | 3/2011 |
| WO | WO-2011/080525 A1 | 7/2011 |

OTHER PUBLICATIONS

Howitt et al., "Cellular Ceramic Diesel Particulate Filter," *SAE Technical Paper Series*, Paper No. 810114, Copyright © 1981 Society of Automotive Engineers, Inc.

Heck et al., *Catalytic Air Pollution Control—Commercial Technology*, Second Edition, John Wiley & Sons, Inc., New York, 2002, Chapters 7 and 9, pp. 130-185 and 212-262.

International Search Report dated May 12, 2011, from PCT International Application No. PCT/GB2011/050160.

British Search Report dated May 31, 2011, from British Patent Application No. 1101674.8.

Li et al., "Application of zeolites as hydrocarbon traps in automotive emission controls," *Studies in Surface Science and Catalysis*, 2005, vol. 158, pp. 1375-1382.

Written Opinion of the International Search Authority dated May 12, 2011, from PCT International Application No. PCT/GB2011/050160.

* cited by examiner

US 8,263,032 B2

OXIDATION CATALYST

CROSS-REFERENCE TO RELATED APPLICATIONS

This application is the U.S. National Phase application of PCT International Application No. PCT/GB2011/050160, filed Feb. 1, 2011, and claims priority of U.S. Provisional Patent Application No. 61/300,279, filed Feb. 1, 2010, the disclosures of both of which are incorporated herein by reference in their entireties for all purposes.

FIELD OF THE INVENTION

The present invention relates to an oxidation catalyst comprising an extruded solid body for use in treating exhaust gas emissions from internal combustion engines from stationary source and mobile, i.e. vehicular (automobile) applications.

BACKGROUND OF THE INVENTION

Society of Automotive Engineers (SAE) Technical Paper 2007-01-0658 is entitled "Fundamental Study and Possible Application of New Concept Honeycomb Substrate for Emission Control" and discloses a diesel oxidation catalyst (DOC) comprising a platinum catalyst dispersed on a catalytic carrier comprising a plurality of extruded segments of gamma-alumina, inorganic fibres and (unnamed) binding material adhesively combined into a full size block. The platinum is applied to the catalytic carrier by a normal impregnation method at 1.0 to 2.7 g per liter.

EP 1739066 discloses a honeycomb structure comprising multiple honeycomb units having multiple through holes; and a seal layer that joins honeycomb units with each other via respective closed outer faces of the honeycomb units where the through holes are not open. The honeycomb unit includes at least inorganic particles, inorganic fibers and/or whiskers. The inorganic particles exemplified are alumina, titania, silica and zirconia; the inorganic fibres exemplified are silica alumina fibres; and the inorganic binders exemplified are silica sol, alumina sol, sepiolite and attapulgite. A catalyst component can be carried on the honeycomb structure. The catalyst component may include at least one type selected among noble metals including platinum, palladium and rhodium, alkali metals such as potassium and sodium, alkaline earth metal e.g. barium and oxides. The honeycomb structure can be used as a catalytic converter e.g. a three-way catalyst or a $NO_x$ storage catalyst for conversion of the exhaust gas of vehicles.

SUMMARY OF THE INVENTION

We have now developed an oxidation catalyst comprising an extruded solid body and at least one metal with particular application in the field of exhaust gas aftertreatment of internal combustion engine exhaust gas. Such exhaust gases may result from stationary source emissions, but they have been developed for use in particular for treating mobile sources of emissions, such as passenger cars, trucks and buses.

According to one aspect, the invention provides an oxidation catalyst comprising an extruded solid body comprising: 10-95% by weight of at least one binder/matrix component; 5-90% by weight of a zeolitic molecular sieve, a non-zeolitic molecular sieve or a mixture of any two or more thereof; and 0-80% by weight optionally stabilised ceria, which catalyst comprising at least one precious metal and optionally at least one non-precious metal, wherein: (i) a majority of the at least one precious metal is located at a surface of the extruded solid body; (ii) the at least one precious metal is carried in one or more coating layer(s) on a surface of the extruded solid body; (iii) at least one metal is present throughout the extruded solid body and is also present in a higher concentration at a surface of the extruded solid body; (iv) at least one metal is present throughout the extruded solid body and is also carried in one or more coating layer(s) on a surface of the extruded solid body; or (v) at least one metal is present throughout the extruded solid body, is present in a higher concentration at a surface of the extruded solid body and is also carried in one or more coating layer(s) on the surface of the extruded solid body.

An advantage of the present invention is that by removing catalytic components that are often used in catalytic coatings, the number of coatings can be reduced, e.g. from two layers to one layer; or a single layer can be removed altogether and catalytic metal can be supported on a surface of the extruded solid body as such. This has benefits in reducing backpressure in an exhaust system, increasing the efficiency of the engine.

Furthermore, by providing the possibility of uncoated catalysts, the extruded solid body can be manufactured at higher cell density, increasing strength and decreasing the thickness of cell walls which can improve light off performance and increase activity through mass transfer.

Also it is possible to increase the volume of active components in an extruded solid body relative to a coating on an inert substrate monolith. This increased catalyst density has advantages for long term durability and catalyst performance, which is important for on-board diagnostics.

DETAILED DESCRIPTION OF THE INVENTION

Figure 1:
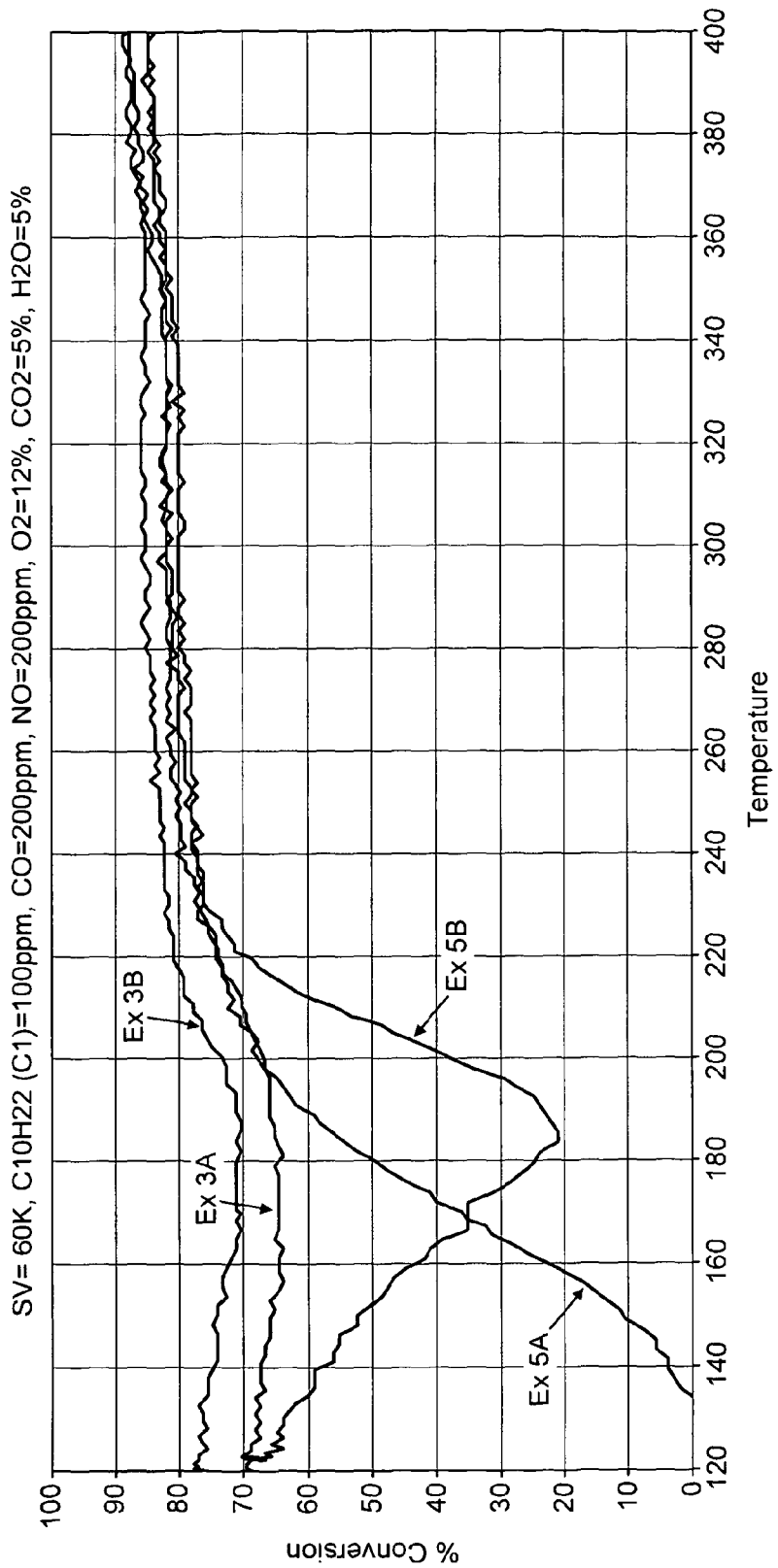
FIG. 1 is a graph comparing the % hydrocarbon conversion activity of a 650° C. aged diesel oxidation catalyst according to Examples 3A and 3B with similarly aged Comparative diesel oxidation catalysts according to Examples 5A and 5B in the test procedure described in Example 6.

"On board diagnostics" (OBD) in the context of a motor vehicle is a generic term to describe the self-diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardised digital connection port and are capable of providing information on standardised diagnostic trouble codes and a selection of real-time data, which enable rapid problem identification and resolution of a vehicle's systems.

Current OBD requirements require that a driver must be notified in case of a malfunction or deterioration of the emission system that would cause emissions to exceed mandatory thresholds. So, for example, the OBD limits for Euro 4: 98/69/EC for passenger diesel vehicles (category M vehicles as defined by 70/156/EEC) are: carbon monoxide (CO)—3.2 g/km; hydrocarbons (HC)—0.4 g/km; nitrogen oxides ($NO_x$)—1.2 g/km; and particulate matter (PM) 0.18 g/km.

Future vehicular emissions legislation, especially in US and Europe, requires higher sensitivity in diagnostic function so as continuously to monitor the ability of an exhaust system aftertreatment catalyst to meet the emission legislation. For example, the current draft OBD limits for Euro 5: 715/2007/EC for compression ignition (diesel) passenger vehicles are: CO—1.9 g/km; non-methane hydrocarbons (NMHC)—0.25 g/km; $NO_x$—0.54 g/km; PM—0.05 g/km.

In US it is understood that the OBD II legislation (Title 13, California Code Regulations, Section 1968.2, Malfunction and Diagnostic System Requirements for 2004 and Subsequent Model-Year Passenger Cars, Light-Duty Trucks and Medium-Duty Vehicles and Engines) for catalyst monitoring of gasoline/spark ignited engines requires a malfunction signal where the average Federal Test Procedure (FTP) test for NMHC conversion efficiency of a monitored portion of a catalyst system falls below 50%.

Extruded solid bodies according to the present invention generally comprise a unitary structure in the form of a honeycomb having uniform-sized and parallel channels extending from a first end to a second end thereof. Generally, the channels are open at both the first and second ends—a so-called "flow through" configuration. Channel walls defining the channels are porous. Typically an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked e.g. with a suitable ceramic cement, and channels not blocked at the first, upstream end can also be blocked at a second, downstream end to form a so-called wall-flow filter. Typically, the arrangement of the blocked channels at the first, upstream end resembles a chequer board with a similar arrangement of blocked and open downstream channel ends.

It is clear that the honeycomb structure disclosed in EP 1739066 has a Thermal Shock Parameter (TSP) too low to be used in a single unitary extrudate, because the honeycomb structure comprises an assembly of individual honeycomb units cemented together. This, arrangement, also seen in commercially available silicon carbide honeycombs, is designed to avoid catastrophic catalyst substrate failure due to inter alia thermal shock as a result of a relatively high Coefficient of Thermal Expansion (CTE) of the extruded material. However, the manufacture of a honeycomb structure from individual honeycomb units is complicated, laborious, time consuming and expensive and increases the number of possible physical failure modes, e.g. at the cement bonds, compared with a single piece extrusion. A more complete explanation of TSP and CTE can be found in "Catalytic Air Pollution Control—Commercial Technology", Second Edition, R. M. Heck et al., John Wiley & Sons, Inc., New York, 2002 Chapters 7 (in relation to flow through monoliths) and 9 (for wall-flow filters).

Accordingly, we prefer that the extruded solid body of the catalyst according to the invention has an axial Thermal Shock Parameter (TSP) and a radial TSP sufficient to avoid radial cracks and ring cracks in the extruded solid body when used for treating exhaust gases from a stationary or mobile source of emissions. In this way the extruded solid body can be formed from a single unitary extrudate. For extruded solid bodies having a particularly large cross-section, it may still be necessary to extrude segments of the extruded solid body for cementing together. However, this is because of difficulties in processing extrudates of such a large cross section, or because of limitations in the size of the extrudate die tooling. Taken individually, however, each segment of the whole catalyst would meet the functional limitation that the axial TSP and the radial TSP are sufficient to avoid radial cracks and ring cracks in the individual extruded solid body segments when used for treating exhaust gases from a stationary or mobile source of emissions. In one embodiment the radial TSP is >0.4 at 750° C., such as >0.5, >0.6, >0.7, >0.8>0.9 or >1.0. At 800° C., the radial TSP is desirably also >0.4 and at 1000° C. is preferably >0.8.

The CTE of wall-flow filters is preferably $20 \times 10^{-7}$/° C. in order to be formed from a one-piece extrudate.

In embodiments, the at least one binder/matrix component can be selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof.

Spinels can be $MgAl_2O_4$ or the Mg can be partially replaced by a metal from the group consisting of Co, Zr, Zn or Mn. The content of MgO in the $MgAl_2O_4$ relative to $Al_2O_3$ can be from 0.8 to 2.5, with values of <1.0 preferred.

The alumina binder/matrix component is preferably gamma alumina, but can be any other transition alumina, i.e. alpha alumina, beta alumina, chi alumina, eta alumina, rho alumina, kappa alumina, theta alumina, delta alumina, lanthanum beta alumina and mixtures of any two or more such transition aluminas.

It is preferred that the alumina is doped with at least one non-aluminium element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica, a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof.

Of this list, the silica can be $SiO_2$, as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof. Alternatively, the silica can be derived from calcining tetramethyl ortho silicate (TMOS) added to the extrusion composition.

Suitable clays include fullers earth, sepiolite, hectorite, a smectite, a kaolin and mixtures of any two or more thereof, wherein the kaolin can be chosen from subbentonite, anauxite, halloysite, kaolinite, dickite, nacrite and mixtures of any two of more thereof; the smectite can be selected from the group consisting of montmorillonite, nontronite, vermiculite, saponite and mixtures of any two or more thereof and the fullers earth can be montmorillonite or palygorskite (attapulgite).

Inorganic fibres are selected from the group consisting of carbon fibres, glass fibres, metal fibres, boron fibres, alumina fibres, silica fibres, silica-alumina fibres, silicon carbide fibres, potassium titanate fibres, aluminum borate fibres and ceramic fibres.

Suitable molecular sieves for use in the present invention are those capable of adsorbing unburned hydrocarbons following cold-start of an automobile engine and desorbing adsorbed hydrocarbons at above ambient temperature, e.g. when an associated precious metal-based oxidation catalyst component has reached a desired light-off temperature for e.g. CO and HC oxidation or $NO_x$ reduction. Such molecular sieves are generally not those having an 8-ring pore opening structure as its largest pore opening structure, sometimes called "small pore" molecular sieves. Preferred molecular sieves are medium pore (maximum 10-ring pore opening structure), large pore (maximum 12-ring pore opening structure) or oven meso pore (>12-ring pore opening structure) molecular sieves.

The or each zeolitic molecular sieve or the or each non-zeolitic molecular sieve can be selected from the framework type code ABW, AEL, AET, AFG, AFI, AFO, AFR, AFS, AFY, AHT, AST, ASV, ATN, ATO, ATS, ATV, AWO, AWW, BCT, BEA, BEC, BIK, BOF, BOG, BPH, BRE, BSV, CAN, CAS, CFI, CGF, CGS, -CHI, -CLO, CON, CZP, DAC, DFO, DOH, DON, EMT, EON, ESV, ETR, EUO, EZT, FAR, FAU, FER, FRA, GIU, GME, GON, HEU, IFR, IMF, ISV, ITH, ITR, IWR, IWS, IWV, IWW, JBW, JRY, LAU, LIO, -LIT, LOS, LOV, LTF, LTL, LTN, MAR, MAZ, MEI, MEL, MEP, MFI, MFS, MOR, MOZ, MRE, MSE, MSO, MTF, MTN, MTT, MTW, MWW, NAB, NAT, NES, NON, NPO, OBW, OFF, OSI, OSO, -PAR, PON, -RON, RRO, RSN, RTE, RUT, RWR, RWY, SAO, SAS, SBE, SBS, SBT, SFE, SFF, SFG, SFH, SFN, SFO, SFS, SGT, SOD, SOF, SOS, SSF, SSY, STF, STI, STO, STT, STW, -SVR, SZR, TER, TOL, TON, TUN, UOS, UOZ, USI, UTL, VET, VFI, VSV, WEI or -WEN (as defined by the Structure Commission of the International Zeolite Association) or is a mixture of any two or more thereof.

Preferred zeolitic and non-zeolitic molecular sieves are selected from the group consisting of BEA, FAU, FER, MFI, MFS, MOR, STI, SZR and mixtures of any two or more thereof.

Particularly preferred zeolitic or non-zeolitic molecular sieves are selected from the group consisting of BEA, FER, MFI, STI and mixtures of any two or more thereof. Particularly preferred zeolitic molecular sieves are ZSM-5, beta, ferrierite and mixtures of any two or more thereof.

Although natural zeolitic molecular sieves can be used in the present invention, we prefer synthetic aluminosilicate zeolitic molecular sieve having a silica-to-alumina ratio of 10 or greater, for example 15 to 150, 20 to 60 or 25 to 40 for improved thermal stability.

In an alternative embodiment, the zeolitic molecular sieve or the non-zeolitic molecular sieve is an isomorph containing one or more substituent framework metal. In this embodiment, the or each substituent framework metal can be selected from the group consisting of As, B, Be, Ce, Co, Cu, Fe, Ga, Ge, Li, Mg, Mn, Zn and Zr, with Ce, Cu and Fe. Again, preferred isomorphic zeolitic or non-zeolitic molecular sieves can be selected from the group consisting of BEA, FER, MFI, NSI, STI and mixtures of any two or more thereof, with BEA including Fe in its framework particularly preferred. It will be understood that the process of manufacturing such isomorphs containing one or more substituent framework metal, the or each metal may be present in the final product either solely in the framework or in the framework and ion-exchanged.

Silica-to-alumina ratios in isomorphs containing one or more substituent framework metal can be >25, such as 30 to 100 or 40 to 70. By contrast, the isomorph can have a silica-to-framework metal ratio of >20, such as from 30 to 200 or 50 to 100.

In a preferred embodiment, the non-zeolitic molecular sieve is an aluminophosphate, including AlPOs, metal substituted AlPOs (MeAlPOs), silicoaluminophosphates (SAPOs) or a metal substituted silicoaluminophosphates (MeAPSOs).

Silica-to-alumina ratios of the aluminophosphates are generally much lower than aluminosilicate zeolites sharing the same framework type code. Typically, the silica-to-alumina ratio of aluminophosphates is <1.0, but can be <0.5 or even <0.3.

The ceria component can be optionally stabilised with at least one non-cerium element to increase the thermal stability of the ceria. Suitable ceria stabilisers include zirconium, lanthanides and mixtures of any two or more thereof. Lanthanide stabilisers include La, Nd, Pr, Gd and mixtures of any two or more thereof. The $CeO_2$:$ZrO_2$ ratio by weight can be e.g. between 80:20 or 20:80. Commercially available materials include 30% by weight $CeO_2$, 63% $ZrO_2$, 5% $Nd_2O_3$, 2% $La_2O_3$; and 40% $CeO_2$, 50% $ZrO_2$, 4% $La_2O_3$, 4% $Nd_2O_3$ and 2% $Y_2O_3$.

Broadly, the at least one metal can be present: (a) throughout the extruded solid body, i.e. the at least one metal is present in the extrudate composition; (b) present in a higher concentration at a surface of the extruded solid body; and/or (c) carried in one or more coating layer(s) on a surface of the extruded solid body in features (iii), (iv) and (v) is different from the at least one metal present in each of the other location(s) at (a), (b) and (c). So according to the invention the at least one metal can be present at location (b), (c), (a) plus (b), (a) plus (c) or (a) plus (b) plus (c). Where the at least one metal is present in (a) and (b), (a) and (c) or (a), (b) and (c), the at least one metal in each location can be the same or different.

Where the at least one metal is present in location (a), i.e. throughout the extruded solid body, the at least one metal can be associated with the zeolitic molecular sieve, the non-zeolitic molecular sieve or the mixture of any two or more thereof. An example of "associated with" includes being ion exchanged with the zeolitic molecular sieve component, the non-zeolitic molecular sieve component or either or both of the zeolitic molecular sieve component and the non-zeolitic molecular sieve components in the mixture. It is also possible in mixtures of two or more molecular sieves to have the at least one metal associated with one molecular sieve and not the other. For example, a first molecular sieve can be ion-exchanged with copper, dried and calcined and then mixed with a different molecular sieve with no associated additional metal.

The inventors have found that by ion-exchanging zeolites, e.g. Beta zeolite, with a transition metal, e.g. iron, the thermal durability of the oxidation catalyst can be improved, and also activity as can be seen in the accompanying Examples.

Alternatively, one of two molecular sieves in a mixture can be associated, e.g. ion exchanged, with a first at least one metal and then a second at least one metal can be added to the extrudate composition.

Suitable at least one metal(s) to associate with the or each molecular sieve component can selected individually from the group consisting of a transition metal, a lanthanide or a mixture of any two or more thereof. Suitable transition metals include Group IB metals, Group IVB metals, Group VB metals, Group VIIB metals and Group VIII metals. Preferably the at least one transition metal is selected from the group consisting of Fe, Cu, Ce, Hf, La, Mn and V and mixtures of any two or more thereof. The lanthanide metal can be La, Pr, Ce and mixtures of two or more thereof.

The total metal content in the at least one metal associated with the or each molecular sieve component is from 0.1 to 20% by weight, such as from 1 to 9% by weight.

The at least one metal present: throughout the extruded solid body but not associated with the or each molecular sieve; in the majority of the at least one metal located at the surface of the extruded solid body; in one or more coating layer(s) on the surface of the extruded solid body; or in the higher concentration at the surface of the extruded solid body can be selected from the group consisting of a transition metal, a lanthanide metal or a mixture of any two or more thereof.

Suitable coatings for supporting catalytic metals for use in the present invention include one or more of alumina ($Al_2O_3$), particularly γ-alumina, silica ($SiO_2$), titania ($TiO_2$), ceria ($CeO_2$), zirconia ($ZrO_2$), vanadia ($V_2O_5$), lanthana ($La_2O_3$) and zeolites. The ceria and alumina can be optionally stabilised using the same stabilisers as used for the extruded solid body. The presence of molecular sieve (zeolite) in one or more coating layer, in addition to the presence of molecular sieve in the extruded solid body, has been shown beneficially to improve hydrocarbon conversion relative to an oxidation catalyst without molecular sieve in one or more coating layer, but molecular sieve present in the extruded solid body (see Example 3B). Therefore the presence of molecular sieve in one or more coating layer is preferred. Suitable catalytic metals include one or more of the precious metals (Au, Ag and the platinum group metals, including Pt, Pd and Rh)).

Techniques for locating at least one metal in higher concentration at the surface of the extruded solid body include impregnation, preferably thickened impregnation, i.e. an impregnation medium thickened with a rheology modifier. Drying methods can also be used to concentrate metals at a surface of the extruded solid body. For example, a so-called "egg shell" technique, where metals are concentrated at the surface can be obtained by drying the impregnated extruded solid body relatively slowly so that the metals are deposited at the surface by wicking. Particular choices of salts and pH conditions can also be used to direct metal deposition, e.g. by determining the isoelectric point of the extruded solid body and then using the correct combination of pH and metal salts to benefit from an electrostatic attraction between cations or anions in the metal salts and the extruded solid body.

Suitable transition metals include a Group IB metal and a Group VIII metal. Preferably, the or each precious metal is selected from the group consisting of Pt, Pd, Au, Ag, Ir, Ru, Rh, Os and mixtures of any two or more thereof; and suitable lanthanide metals can be La, Pr or Ce or mixtures of any two or more thereof.

The total metal content throughout the extruded solid body but not associated with the or each molecular sieve component; located at the surface of the extruded solid body; and/or in the higher concentration at the surface of the extruded solid body can be from 0.1 to 20% by weight, such as from 1 to 9% by weight.

The total metal content of the extruded solid body, i.e. including any metal associated with the or each molecular sieve, can be from 0.1 to 25% by weight, such as from 1 to 15% by weight.

The total metal content of the catalyst as a whole, including one or more coating layer(s) on a surface of the extruded solid body comprises at least one metal, can be from 0.1 to 30% by weight, such as from 1 to 25% by weight.

The content of the at least one binder/matrix component can be >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the spinel can be >10% by weight, >15% by weight, >20% by weight, >30% by weight, >35% by weight, >40% by weight, >45% by weight, >50% by weight, >55% by weight, >60% by weight, >65% by weight or >70% by weight.

The content of the total content of the molecular sieve(s) can be >10% by weight, >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight or >85% by weight.

The content of the optionally stabilised ceria can be >5% by weight, >10% by weight, >15% by weight, >20% by weight, >30% by weight, >35% by weight, >40% by weight, >45% by weight, >50% by weight, >55% by weight, >60% by weight, >65% by weight or >70% by weight.

The content of the inorganic fibres can be >5% by weight, >10% by weight, >15% by weight or >20% by weight.

In an embodiment the extruded solid body consists essentially of: 10-50% by weight of cordierite, nitrides, carbides, borides, intermetallics, lithium aluminosilicate, a spinel, an optionally doped alumina, a source of silica, titania, zirconia, titania-zirconia, zircon and mixtures of any two or more thereof; 50-90% by weight of a zeolitic molecular sieve, a non-zeolitic molecular sieve or a mixture of any two or more thereof, each optionally containing one or more metal; and 0-25% by weight of inorganic fibres.

Further embodiments can use an extruded solid body consisting essentially of: 10-37% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 60-88% by weight of a zeolitic molecular sieve, a non-zeolitic molecular sieve or a mixture of any two or more thereof, each optionally containing one or more metal; and 0-20% by weight of inorganic fibers; or: 15-30% by weight of cordierite, nitrides, carbides, borides, intermetallics, lithium aluminosilicate, an optionally doped alumina, a spinel, titania, zirconia, titania-zirconia, zircon and mixtures of any two or more thereof; 2-20% by weight of a source of silica; 50-81% by weight of a zeolitic molecular sieve, a non-zeolitic molecular sieve or a mixture of any two or more thereof, each optionally containing one or more metal; and 2-10% by weight of inorganic fibres.

In another embodiment suited for use in diesel oxidation catalysts, the extruded solid body can consist essentially of: 10-75% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 5-50% by weight of a zeolitic molecular sieve, a non-zeolitic molecular sieve or a mixture of any two or more thereof, each optionally containing one or more metal; 20-80% by weight optionally stabilised ceria; and 0-25% by weight of inorganic fibres. Preferred embodiments contain zeolites and inorganic fibres.

In developing extruded solid bodies for use in NO$_x$ trap catalysts according to the present invention, we have encountered a lack of strength in the extruded solid body in the composition: 69% by weight of CeO$_2$, and 23% by weight of γ-Al$_2$O$_3$ and 8% by weight glass fibres. Current proposals for increasing strength include pre-calcining the CeO$_2$ material to reduce surface loss during calcinations of the "green" extruded solid body; increasing the alumina content to 50%+; changing the particle size of the alumina (e.g. from commercially available Pural™ to Disperal™) and/or the optionally stabilised ceria; adding an inert binder to increase mechanical stability e.g. a clay; use a different alumina e.g. an alumina sol; testing other binder systems e.g. TiO$_2$ sols, CeO$_2$ sols; cerium acetate; zirconium acetate; optimising the pH; and adding surface modifiers e.g. aluminium salts or other organic surfactants. In preliminary tests we have found that the presence of silica can affect NO$_x$ trap performance. Research is continuing and this option will be further investigated. However, in one embodiment the content of a source of silica will be reduced or removed altogether.

In more specific examples according to the present invention:

(i) a diesel oxidation catalyst comprises an extruded solid body in the flow-through configuration consisting essentially of: 15-50% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-20% by weight of a source of silica; 50-81% by weight of a zeolitic molecular sieve, a non-zeolitic molecular sieve or a mixture of any two or more thereof, each optionally containing one or more metal; and 0-20% by weight of inorganic fibres, which extruded solid catalyst body being coated with a first, inner layer comprising supported Pt; Pd; Au; Pt and Pd; Pd and Au; and a second, outer catalyst layer comprising supported Pt; Pd; Au; Pt and Pd; Pd and Au; and wherein where the metal(s) present is the inner layer and the outerlayer are the same, the metal loadings are different in the inner layer from the outer layer; and (ii) a catalysed soot filter comprises an extruded solid body in the wall-flow filter configuration consisting essentially of: 15-70% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-20% by weight of a source of silica; 5-50% by weight of a zeolitic molecular sieve, a non-zeolitic molecular sieve or a mixture of any two or more thereof, each optionally containing one or more metal; 20-80% by weight optionally stabilised ceria; and 0-20% by weight of inorganic fibres, which extruded solid catalyst body being coated with one or more layer(s) comprising supported at least one precious metal and combinations of any two or more precious metals;

According to a further aspect, the invention provides a process of manufacturing an oxidation catalyst according to the invention comprising the steps of: forming a solid extruded body by mixing powdered starting materials of: at least one binder/matrix component or a precursor of one or more thereof; zeolitic molecular sieve, non-zeolitic molecular sieve or a mixture of any two or more thereof which zeolitic molecular sieve, non-zeolitic molecular sieve or mixture of zeolitic and non-zeolitic molecular sieves being optionally associated with at least one metal; an optional optionally stabilised ceria; and an optional at least one metal compound; with optional inorganic fibres; and optionally adding an organic auxiliary agent; processing by mixing and/or kneading in an acid or alkaline aqueous solution optionally containing a metal salt of at least one metal into a plastic compound to form a mixture; extruding the mixture into a catalyst body, drying the catalyst body and calcining to form a solid extruded body; selecting quantitative proportions of the starting materials such that the solid extruded body comprising 10-95% by weight of at least one binder/matrix component; 5-90% by weight of a zeolitic molecular sieve, a non-zeolitic molecular sieve or a mixture of any two or more thereof; and 0-80% by weight optionally stabilised ceria and optionally at least one metal, and impregnating a surface of the solid extruded body with at least one metal and/or coating a surface of the solid extruded body with at least one coating layer(s) containing at least one metal.

Typically, a cement is used impermeably to plug ends of channels in an extruded substrate monolith to form the wall-flow filter, e.g. as is disclosed in EP 1837063.

Very generally, the production of an extruded solid body, a binder, an organic viscosity-enhancing compound and a liquid for converting the material by blending into an homogeneous paste are added to the binder/matrix component or a precursor thereof and molecular sieve, optional optionally stabilised ceria, optional inorganic fibres and optional at least one metal compound, and the mixture is compacted in a mixing or kneading apparatus or an extruder. The mixtures have organic additives such as binders, plasticizers, surfactants, lubricants, dispersants as processing aids to enhance wetting and therefore produce a uniform batch. The resulting plastic material is then moulded, in particular using an extrusion press or an extruder including an extrusion die, and the resulting mouldings are dried and calcined. The organic additives are "burnt out" during calcinations of the extruded solid body.

The at least one binder/matrix component may be selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. An alumina precursor can be used which is aluminium hydroxide or boehmite. Where an aluminium oxide is used, to ensure the binding with the aluminium oxide, it is advantageous to add an aqueous solution of a water-soluble metal salt to the aluminium oxide or the precursor substance of the aluminium oxide before adding the other starting materials.

In embodiments, the silica source can be selected from the group consisting of a silica, a silica sol, quartz, fused or amorphous silica, sodium silicate, an amorphous aluminosilicate, an alkoxysilane, a silicone resin binder, a clay, talc or a mixture of any two or more thereof.

In a particular embodiment, the silica source is a silicone resin binder and a solvent for the silicone resin binder is isopropyl alcohol or a dibasic ester.

One embodiment of the process according to the present invention comprises the step of first admixing an optionally doped alumina or a precursor thereof with the solution and subsequently admixing the zeolitic molecular sieve, non zeolitic molecular sieve or a mixture of any two or more thereof and the inorganic fibres.

The organic auxiliary agent for use in the process according to the present invention can be one or more selected from the group consisting of a cellulose derivative, an organic plasticizer, a lubricant and a water-soluble resin. Examples of suitable cellulose derivatives include cellulose ethers selected from the group consisting of methylcellulose, ethylcellulose, carboxymethylcellulose, ethylhydroxyethylcellulose, hydroxyethylcellulose, hydroxypropylcellulose, methylhydroxyethylcellulose, methylhydroxypropylcellulose and combinations of any two or more thereof. Cellulose derivatives increase the porosity of the final product, which is advantageous for the catalytic activity of the solid catalyst body. Initially the cellulose swells in the aqueous suspension but is ultimately removed during the calcining process.

The organic plasticizer for use in the process of the present invention is selected from the group consisting of polyvinyl alcohol, polyvinyl butyral, an ionomer, acrylics, copolyethylene/acrylic acid, polyurethane, a thermoplastic elastomers, a relatively low molecular weight polyester, linseed oil, a ricinoleate and combinations of any two or more thereof.

The water-soluble resin can be a polyacrylate.

The lubricant for use in the process according to the present invention is selected from at least one of the group consisting of ethylene glycol, stearic acid, sodium stearate, glycerine and glycols.

Depending on the composition of the extrudate composition, the pH can be acid or alkaline. Where the process uses an acidic aqueous solution, the pH-value of the solution can be between 3 and 4. Desirably, acetic acid is used to acidify the solution.

Where the process uses an alkaline aqueous solution, the pH-value of the solution can be between 8 and 9. Ammonia can be used to adjust the pH to the alkaline side.

According to a further aspect, the invention provides a method of treating exhaust gas emissions from internal combustion engines from a stationary source or a vehicle, which method comprising contacting the exhaust gas with an oxidation catalyst according to the invention. The temperature at which the exhaust gas contacts the catalyst is preferably >100° C., such as >150° C., >175° C., >200° C., >225° C., >250° C., >275° C. or >300° C. Preferably, the temperature at which the exhaust gas contacts the catalyst is <600° C., such as <550° C., <525° C. or <500° C.

According to a further aspect, there is provided an exhaust system for an internal combustion engine, which exhaust system comprising an oxidation catalyst according to the invention. The internal combustion engine can be a compression ignition engine or a positive ignition engine. A positive ignition engine is typically fuelled with gasoline fuel, but other fuels can be used including gasoline fuel blended with oxygenates including methanol and/or ethanol, liquid petroleum gas or compressed natural gas. Compression ignition engines can be fuelled by diesel fuel, blends of diesel fuel and biodiesel or Fischer-Tropsch derived fuels, biodiesel as such or natural gas as such. Modern compression ignition engines including those known as the Dilution Controlled Combustion System (DCCS), for example Toyota's Smoke-less Rich Combustion concept. Emissions from Homogeneous Charge Compression Ignition (HCCI) engines may also be treated. In particular, modern engines wherein substantially all fuel for combustion is injected into a combustion chamber prior to the start of combustion may be treated.

According to a further aspect of the invention, there is provided a vehicle comprising an internal combustion engine (optionally as defined hereinabove) and an exhaust system according to the invention.

EXAMPLES

In order that the invention may be more fully understood, the following non-limiting Examples are provided.

Example 1

Extruded Zeolite Monolith Substrate Containing H-Beta Zeolite

An extruded zeolite monolith substrate was made according to methods similar to those disclosed in U.S. Pat. No. 7,507,684. Powdered commercially available beta zeolite in hydrogen form is mixed with glass fibres, Kaolin filler and powdered synthetic boehmite (Pural SB) and is processed in an aqueous solution with a pH-value of 5-6 into a shapeable and flowable slip by admixture with cellulose (CMC-QP10000H), the plasticizer Zusoplast (a brand name of Zschimmer & Schwarz GmbH & Co KG) and the organic auxiliary agent PEO Alkox (a polyethylene oxide). The quantitative proportions of the starting materials are selected in such a way that the active material of the finished solid catalyst body contains 69% by weight of zeolite, 23% by weight of $\gamma$-$Al_2O_3$, 5% by weight of glass fibers and 3% by weight of Kaolin. The shapeable mixture is extruded into a 1" diameter×3" long flowthrough honeycomb catalyst body, i.e. with continuous channels and with a circular cross-section exhibiting a cell density of 400 cpsi (cells per square inch). Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body.

Example 2

Extruded Zeolite Monolith Substrate Containing Fe-Beta Zeolite

Powdered commercially available beta zeolite in hydrogen form is mixed with iron hydroxide, glass fibres, a low alkaline clay filler and powdered synthetic boehmite (Pural SB) and is processed in an aqueous solution with a pH-value of 5-6 into a shapeable and flowable slip. When the mixture is well plasticised, cellulose is added at 8 wt % based on 100% of the total inorganic solids content. The quantitative proportions of the starting materials are selected in such a way that the active material of the finished solid catalyst body contains 55% by weight of zeolite, 25% by weight of the clay, 7% by weight of $\gamma$-$Al_2O_3$, 8% by weight of glass fibers and 5% by weight of iron and iron compounds. The shapeable mixture is extruded into a 1" diameter×3" long flow-through honeycomb catalyst body, i.e. with continuous channels and with a circular cross-section exhibiting a cell density of 400 cpsi (cells per square inch). Subsequently, the catalyst body is freeze dried for 1 hour at 2 mbar according to the method described in WO 2009/080155 (the entire contents of which is incorporated herein by reference) and reductively calcined according to the method described in PCT patent application no. PCT/EP2010/005140 filed on 21 Aug. 2010 (the entire contents of which is incorporated herein by reference) at a temperature of 580° C. to form a solid catalyst body. It is found that by using the method described that at least some of the iron introduced into the mixture becomes ion-exchanged with the zeolite.

Example 3

Two-Layer Diesel Oxidation Catalyst on Extruded Zeolite Monolith Substrate of Example 1

To a 400 cpsi extruded beta zeolite 1"×3" flow through sample prepared according to Example 1 was washcoated (according to the techniques in WO 99/47260) with a first layer comprising a mixture of Pt and Pd/$\gamma$-alumina washcoat (Example 3A); or a first layer comprising a mixture of Pt and Pd/$\gamma$-alumina and H-beta zeolite (Example 3B). The resulting products were dried and calcined to 600° C. A second washcoat layer of Pt/$\gamma$-alumina overlying the first layer was applied to each of Examples 3A and 3B and the resulting coated part was dried then calcined at 600° C. The ratio of precious metals present was 2Pt:Pd with a total precious metal loading of 105 g in$^{-3}$.

A separate 400 cpsi 5"×6" substrate monolith was coated with a two layer catalyst as described for Example 3B for engine testing in Example 7. The 5"×6" catalyst was aged at 800° C. for 50 hours in 5% $H_2O$ and was designated Example 3C.

Example 4

Two-Layer Diesel Oxidation Catalyst on Extruded Zeolite Monolith Substrate of Example 2

400 cpsi extruded 5 wt % ion-exchanged Fe-beta zeolite 1"×3" flow through sample of Example 2 was coated with a two layer catalyst as described for Example 3A. This sample was aged in air at 650° C. for 64 hours in 5% $H_2O$.

Comparative Example 5

Two Layer Diesel Oxidation Catalyst on Cordierite Monolith Substrate

Identical two-layer catalysts to Examples 3A and 3B were prepared using commercially available 400 cpsi cordierite substrate monoliths instead of extruded zeolite monolith substrates and 1"×3" cores were cut from them (Comparative Examples 5A and 5B respectively).

Separate 400 cpsi 5"×6" substrate monoliths were coated with a two layer catalyst as described for Examples 3A and 3B for engine testing in Example 7. The 5"×6" catalysts were aged at 800° C. for 50 hours in 5% $H_2O$ and designated 5C and 5D respectively.

Example 6

Diesel Oxidation Catalyst Laboratory Testing

Figure 2:
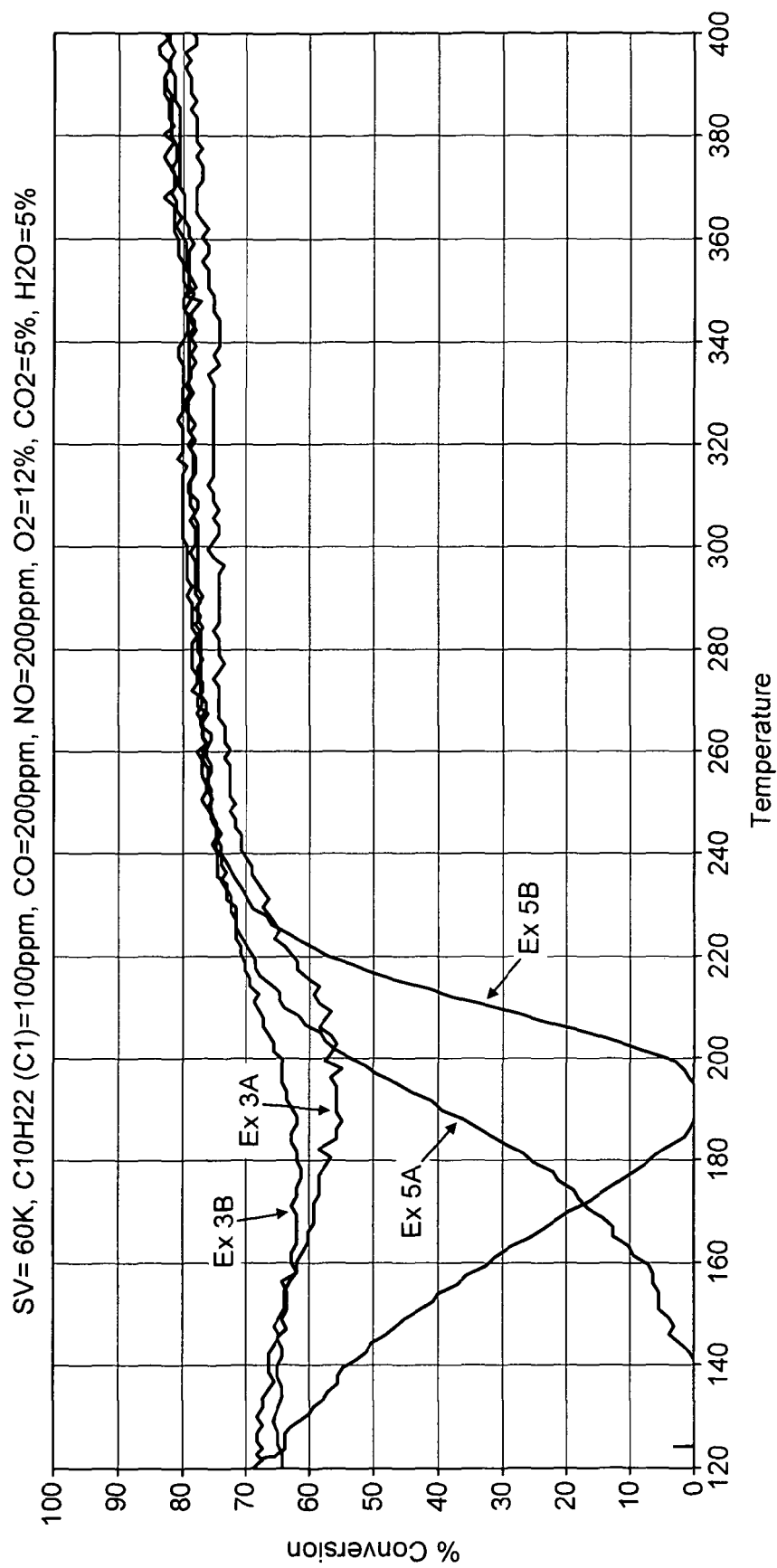
FIG. 2 is a graph comparing the % hydrocarbon conversion activity plotted against temperature of an 800° C. aged diesel oxidation catalyst of Examples 3A and 3B and a similarly aged Comparative diesel oxidation catalysts of Examples 5A and 5B in the test procedure described in Example 6.

The 1"×3" samples of each of Examples 3A and 3B and Comparative Examples 4A and 4B were aged in air either at 650° C. for 64 hours in 5% $H_2O$ (results shown in FIG. 1); or at 800° C. for 50 hours in 5% $H_2O$ (results shown in FIG. 2).

Each sample was tested in a laboratory synthetic catalyst activity test (SCAT) rig, using the following synthetic regular lean conditions: Swept Volume (SV)=60K, $C_{10}H_{22}$=100 ppm Cl, CO=200 ppm, $NO_x$=200 ppm, $O_2$=12%, $CO_2$=5%, $H_2O$=5% in $N_2$; temperature ramp up from 120° C. to 400° C. at 40° C. per minute.

From FIGS. 1 and 2 it can be seen that both Examples 3A and 3B show significantly better hydrocarbon conversion activity at lower temperatures e.g. 120-240° C. than either Comparative Examples 5A and 5B. It can also be seen that, between Examples 3A and 3B, Example 3B, which contains the H-beta zeolite in the inner, first layer in addition to the extruded substrate, performs better than Example 3A without the H-beta zeolite in the inner washcoat layer.

Figure 3:
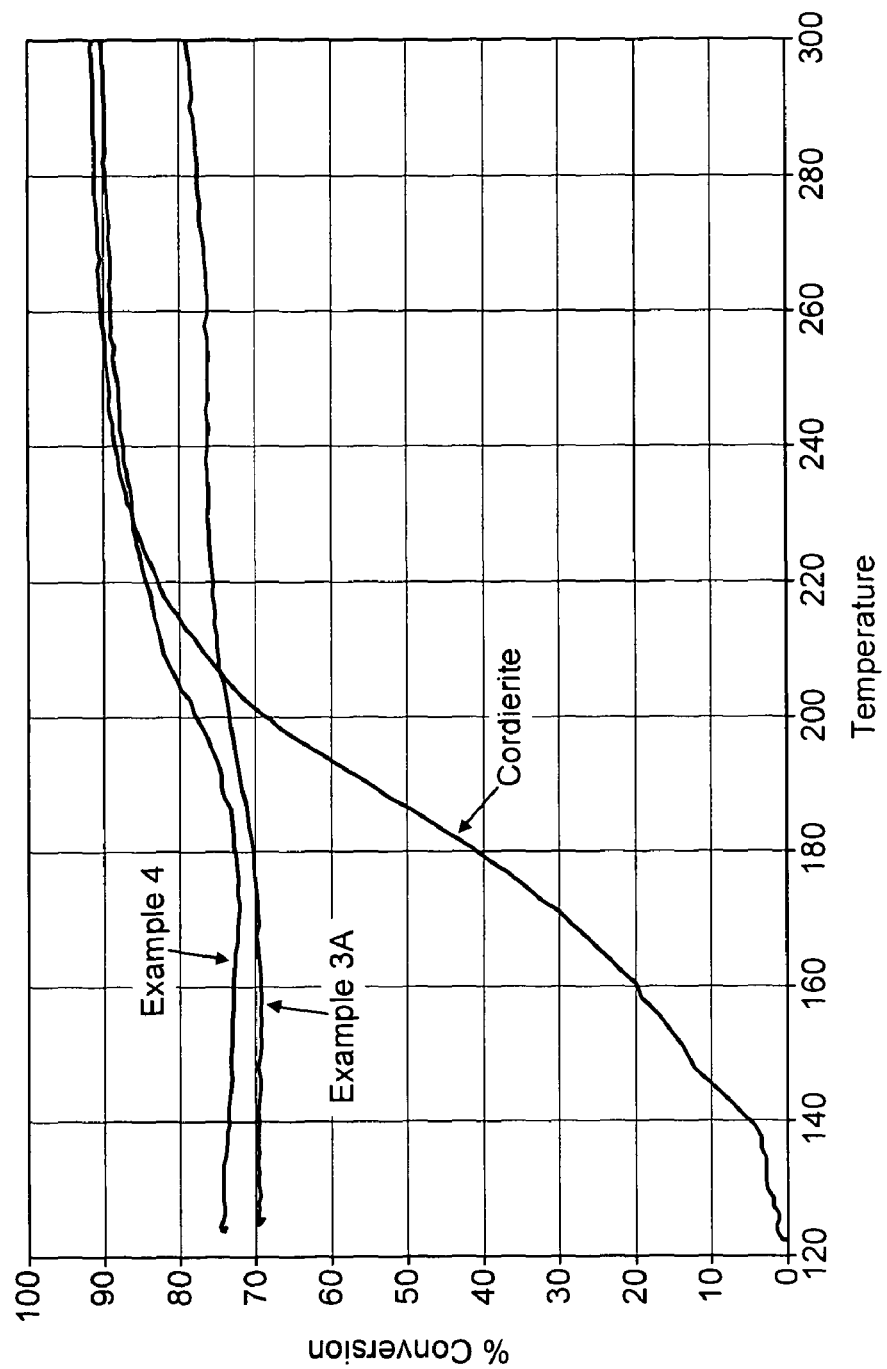
FIG. 3 is a graph comparing the % hydrocarbon conversion activity plotted against temperature of a 650° C. aged diesel oxidation catalyst according to Examples 3A and 4 compared to a bare cordierite flow through substrate.

From FIG. 3 it can be seen that the catalyst of Example 4 has a higher hydrocarbon conversion activity than the catalyst of Example 3A. The inventors conclude that the catalyst comprising the extruded solid body including Fe ion-exchanged Beta retains aged activity more effectively than the extruded solid body wherein the Beta zeolite is not metallised (H-Beta).

Example 7

Diesel Oxidation Catalyst Engine Testing

The catalysts of Example 3C and Examples 5C and 5D were tested in turn by fitting them in the exhaust system of a bench-mounted 2007 certified 6.4 liter light heavy duty diesel engine fitted with an engine dynamometer. The engine was run at a speed and torque rate sufficient to produce a catalyst inlet temperature of 150° C. (at 100K/hr swept volume). The torque was increased at a linear rate sufficient to increase the catalyst inlet temperature at 15° C. per minute to a total inlet temperature of 350° C. (at 140K/hr swept volume).

Figure 4:
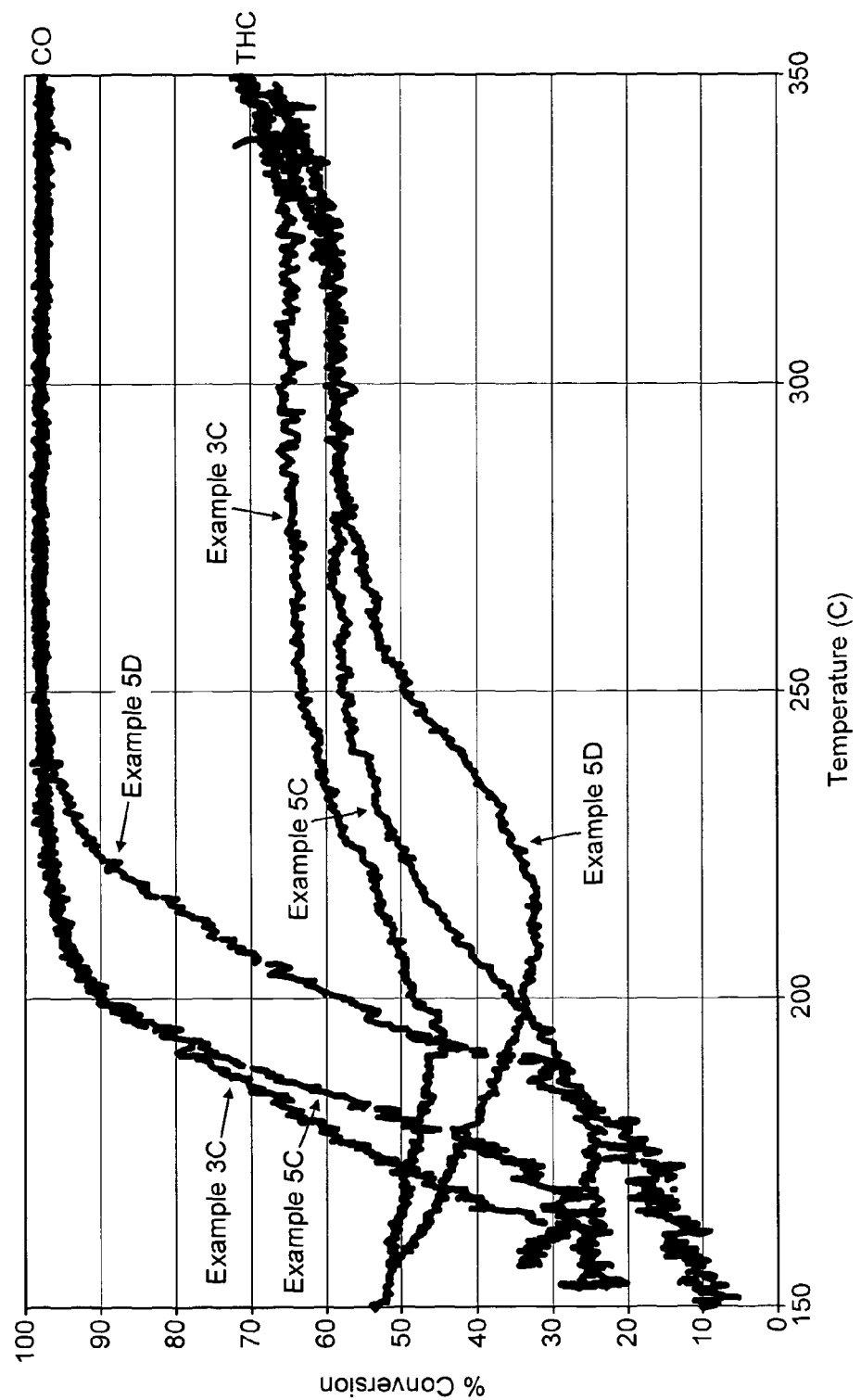
FIG. 4 is a graph comparing the carbon monoxide (CO) conversion activity and the total hydrocarbon (THC) conversion activity for Examples 3C, 5C and 5D plotted against temperature.

The CO % conversion and total hydrocarbon (THC) % conversion over the catalyst was determined over the course of the tests and is plotted against temperature in the accompanying FIG. 4 from which it can be seen that the catalyst of Example 5D including zeolite in its washcoat underlayer shows initially reasonable THC conversion at 150° C., which however falls below the THC conversion of Example 5C at 200° C. before recovering to parity with Example 5C at above 275° C. The inventors interpret that the initial THC conversion of Example 5D over Example 5C results from HC adsorption at low temperature. However, it can be seen that the THC conversion of Example 3C according to the invention is better than either Example 5C or 5D, which do not include zeolite in the extruded substrate body.

The CO conversion of Example 3C according to the invention is broadly similar to that of Example 5C, with some better light of activity observed at low temperature.

Example 8

Extruded Zeolite Monolith Substrate

An alternative extruded zeolite monolith substrate to Example 1 was made according to methods similar to those disclosed in U.S. Pat. No. 7,507,684. Powdered commercially available beta zeolite in hydrogen form (Tosoh) is mixed with glass fibres (Vetrotex 4.5 mm (Saint-Gobain)), low alkaline clay filler and powdered synthetic boehmite (Pural SB) and is processed in an aqueous solution with a pH-value of 5-6 into a shapeable and flowable slip by admixture with 8 wt % cellulose (based on the total inorganic solids content) (CVP-M-5280 (Dow Wolff Cellulosics)). The quantitative proportions of the starting materials are selected in such a way that the active material of the finished solid catalyst body contains 60% by weight of zeolite, 25% by weight of clay, 7% by weight $\gamma$-$Al_2O_3$ and 8% by weight of glass fibres. The shapeable mixture is extruded into a flow-through honeycomb catalyst body, i.e. with continuous channels and with a circular cross-section in a desired cell density. Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body.

Example 9

Extruded $V_2O_5$/$WO_x$—$TiO_2$ Filter

A Reference extruded $V_2O_5$/$WO_x$—$TiO_2$ solid body was prepared similarly to Examples 1 and 5 by blending components A, B, F and S as set out in Table 1 with water to make a kneadable paste. Additives H (pore modifiers) were added and the material was kneaded for 10 mins to disperse the pore modifiers. The resulting composition was extruded, dried and calcined as described in Examples 1, 2 and 7. It should be noted that the percentage quantities of inorganic solids present in the final calcined article is 100%. Quantities of additives (here H and S) that are removed by combustion during calcination are provided in wt % relative to the 100% inorganic solids content.

TABLE 1

| Active Components | | Binder | | | Stabilizer | Extrusion Additive | | | Additional Additives | | |
|---|---|---|---|---|---|---|---|---|---|---|---|
| A1 | A2 | B1 | B2 | B3 | F1 | H1 | H2 | H3 | S1 | S2 | S3 |
| 82.90 | 1.70 | 3.00 | 3.00 | 1.40 | 8.00 | 1.00 | 1.00 | 0.30 | 1.76 | 9.20 | 0.56 |

A1 = TiW (98.9%, MC 10/(Cristal)
A2 = $V_2O_5$ from AMV (78% $V_2O_5$, GFE)
B1 = Bentonite (90%, ACE/Mizuka)
B2 = Kaolin (97.9% TK0177/Thiele)
B3 = $SiO_2$ (100%, Tixosil/Novus)
F1 = Glass fibers (Vetrotex 4.5 mm/Saint Gobain)
H1 = Celluslose (QP10000H/Nordmann)
H2 = PEO (Alkox/Alroko)
H3 = Zusoplast (Zschimmer&Schwarz)
S1 = MEA (Imhoff & Stahl)
S2 = $NH_3$
S3 = $C_3H_6O_3$ (Fauth)

The following pore modifiers were used instead of the Extrusion Additives H1, H2 and H3 in Table 1, with amounts shown being relative to the total weight of inorganic solid in the recipe of Table 1.

TABLE 2

| Pore Modifier | Wt % Used in Table 1 Recipe | Pore Volume (mm³/g) | Pore Radius (Å) | Porosity (%) |
|---|---|---|---|---|
| Reference | See Table 1 | 310.1 | 1783.6 | 39.8 |
| Cellulose CMC-QP10000H (Nordmann) | 20 | | | |
| BC200 (Kremer Pigmente GmbH & Co. KG) | 13 | | | |
| PAN Fibres | 13 | | | |
| Recycling | 9 | 333.6 | 1930.9 | 41.2 |
| Arbocel (Schwarzwälder Textil-Werke) | 10 | 427 | 2950 | 47.2 |
| HOP Fibre (Osthoff-Petrasch GmbH) | 10 | 426 | 2629 | 48.8 |
| Arbocel (Schwarzwälder Textil-Werke) | 15 | 524 | 5281 | 50.2 |
| HOP Fibre (Osthoff-Petrasch GmbH) | 15 | 543 | 3085 | 54.4 |

Porosity and pore volume and pore radius can be measured e.g. using mercury intrusion porosimetry.

Figure 5:
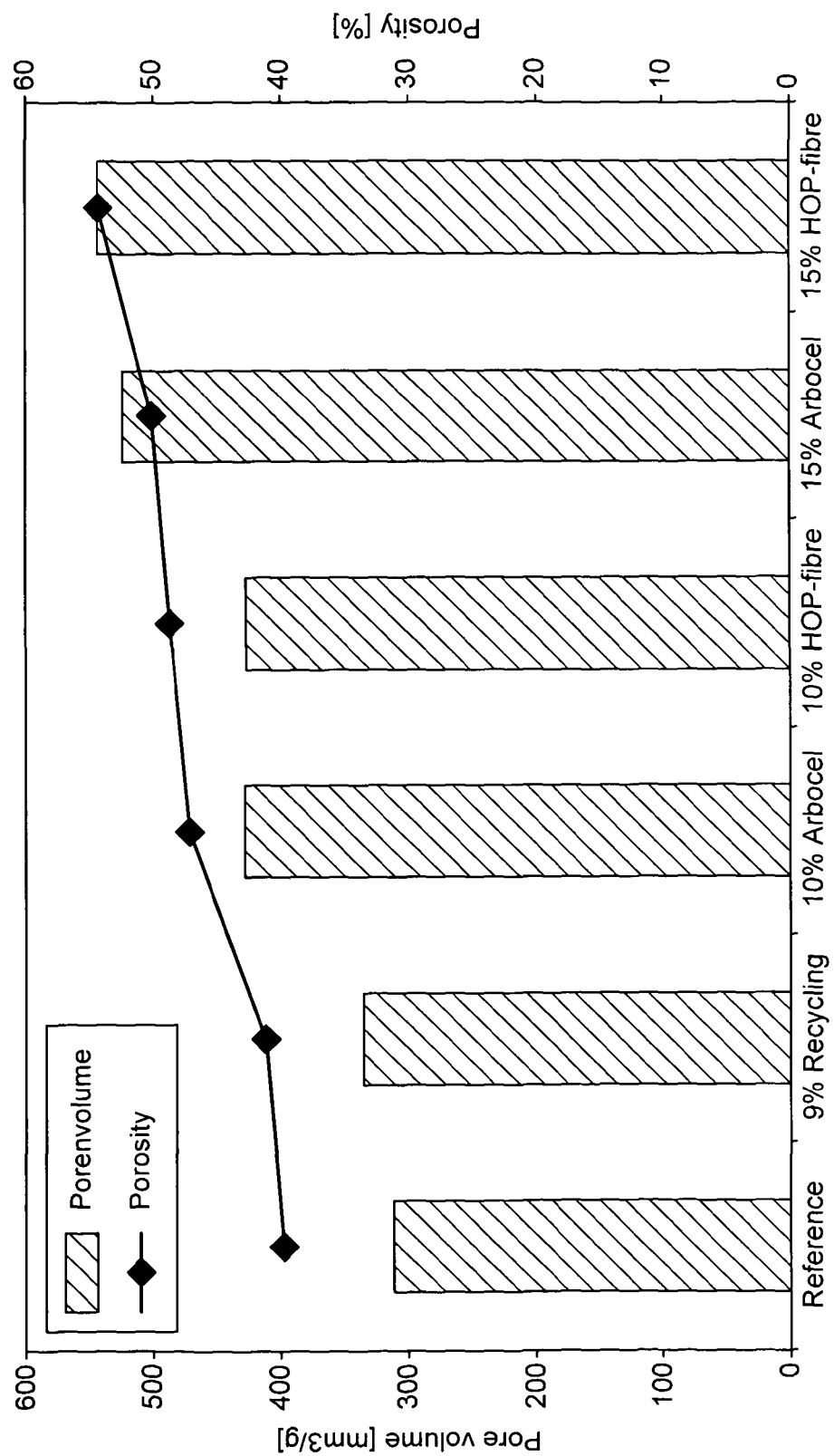
FIG. 5 is a graph comparing the pore volume and porosity of various $V_2O_5/WO_x$—$TiO_2$ filter materials prepared using various pore modifiers relative to a Reference product used in a flow-through configuration.

The results of Table 2 entries including pore volume and porosity are also represented in FIG. 5. It can be seen from these results that the porosity and pore volume of the Reference can be increased by appropriate selection of pore modifiers so that an extruded solid body made using such pore modifiers may be used in the manufacture of wall-flow filters.

These results are generic for increasing the porosity, pore volume etc. properties independent of the active components of the solid extruded body. That is, although increasing porosity and pore volume etc. of this Example 6 are illustrated using $V_2O_5/WO_x$—$TiO_2$ active materials, the principles of increasing porosity and pore volume etc. disclosed in this Example 6 are applicable to the extrusion of any active material, e.g. an extruded solid body for use in a gasoline soot filter comprising a three-way catalyst, because the pore modifiers are burnt out in the calcination process leaving the active materials and fillers etc. behind as inorganic solids.

Figure 6:
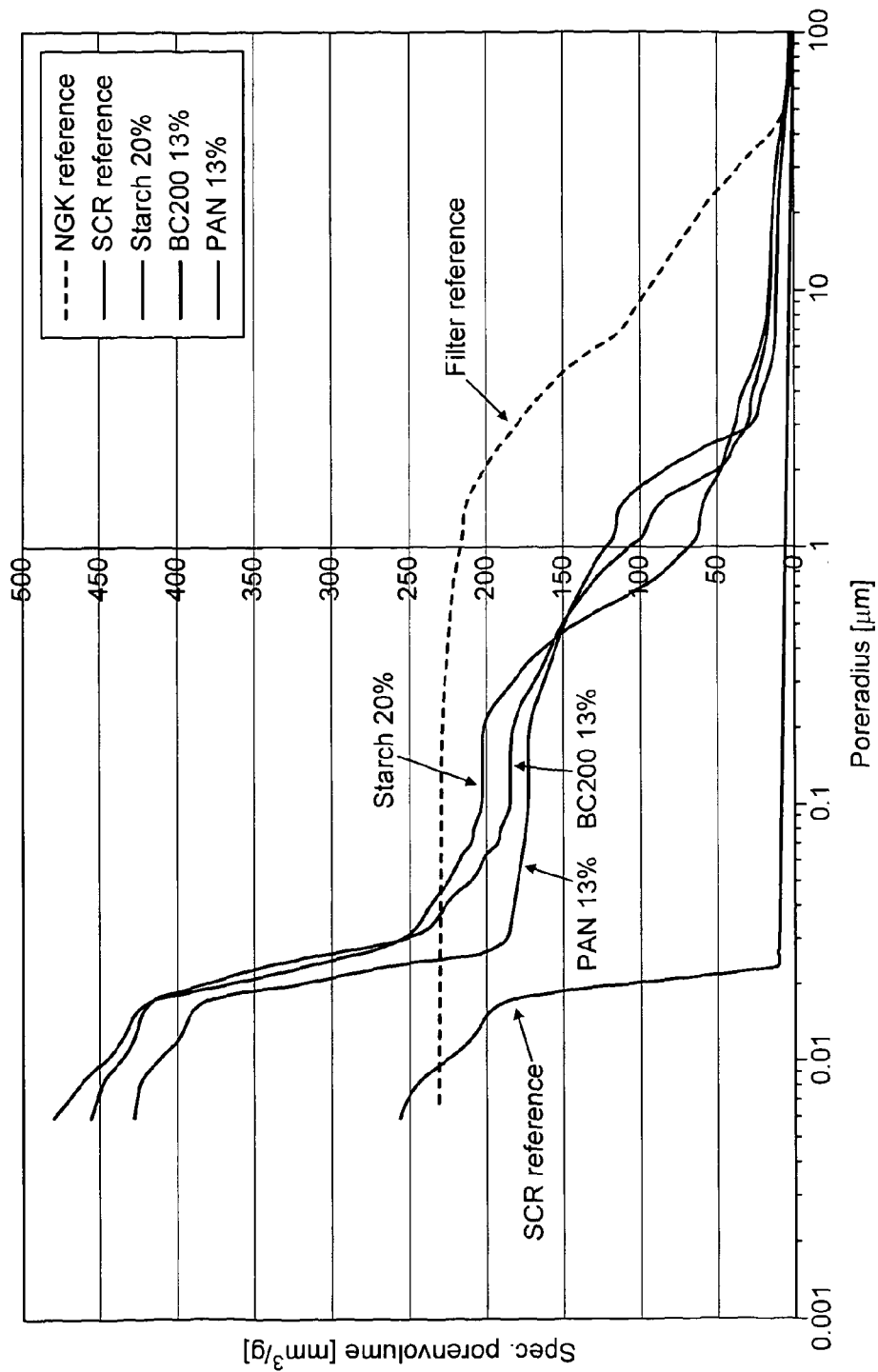
FIG. 6 is a graph plotting the pore volume against pore radius for a number of pore modifiers relative to the $V_2O_5/TiO_x$—$TiO_2$ Reference and a commercially available wall-flow filter substrate.

FIG. 6 compares the pore volume of a different Reference with solid extruded $V_2O_5/WO_x$—$TiO_2$ materials prepared using other pore modifiers set out in Table 2 compared also with a commercially available wallflow filter (NGK). It can be seen from the graph that the inclusion of pore modifiers has improved the porosity and pore volume of the Reference extruded solid body so that the materials have properties approaching those of commercially available wall-flow filters.

Example 10

Extruded Catalysed Soot Filter

This is a prophetic example. A catalysed wall-flow filter monolith substrate can be prepared as follows. An appropriate amount of $CeO_2$—$ZrO_2$ mixed oxide may be mixed with glass fibres, powdered synthetic boehmite (Pural SB) and beta zeolite and processed in an aqueous solution with a pH-value of 3.5 into a shapeable and flowable slip containing 1.2 wt % cellulose (CMC-QP10000H), 1.0 wt % of the organic auxiliary agent PEO Alkox (a polyethylene oxide) and 13 wt % of a mixture of the pore modifiers Rettenmaier BC200 and polyacrylonitrile (PAN) fibres. The quantitative proportions of the starting materials may be selected in such a way that the active material of the finished solid catalyst body contains 25% by weight of $CeO_2$—$ZrO_2$, 15 wt % beta zeolite, 52% by weight of $\gamma$-$Al_2O_3$ and 8% by weight glass fibres. The shapeable mixture can then be extruded into a honeycomb catalyst body with continuous channels and with a circular cross-section exhibiting a cell density of 300 cpsi (cells per square inch). Subsequently, the catalyst body can be freeze dried for 1 hour at 2 mbar according to the method described in WO 2009/080155 (the entire contents of which is incorporated herein by reference) and calcined at a temperature of 580° C. to form a solid catalyst body. Typically, it would be expected that the resulting product would have a mean pore size of approximately 10 μm.

The extruded flow-through monolith substrate comprising a plurality of channels may be made into a wall-flow filter arrangement whereby a plurality of first channels is plugged at an upstream end and a plurality of second channels not plugged at the upstream end are plugged at a downstream end, wherein the arrangement of the first and second channels is such that laterally and vertically adjacent channels are plugged at opposite ends in the appearance of a checkerboard by inserting substantially gas impermeable plugs at the ends of the channels in the desired pattern according to EP 1837063 (the entire contents of which is incorporated herein by reference). This filter arrangement is also disclosed in SAE 810114 (the entire contents of which is incorporated herein by reference). The calcined extruded monolith substrate can be coated with a washcoat comprising Pt—Pd according to the methods disclosed in WO 99/47260 or PCT/GB2011/050005 filed on 4 Jan. 2011. The latter method comprises the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

For the avoidance of any doubt, the entire contents of any and all documents cited herein are incorporated herein by reference.

The invention claimed is:

1. An oxidation catalyst comprising an extruded solid body comprising:
   10-95% by weight of at least one binder/matrix component;
   5-90% by weight of a molecular sieve selected from the group consisting of a zeolitic molecular sieve, a non-zeolitic molecular sieve, and a mixture of any two or more thereof, wherein the zeolitic molecular sieve is a synthetic aluminosilicate zeolite and has a silica-to-alumina ratio of 10 to 150, and wherein the zeolitic molecular sieve is a medium pore molecular sieve, a large pore molecular sieve, or a meso pore molecular sieve; and
   0-80% by weight optionally stabilised ceria,
   which catalyst comprising at least one precious metal and optionally at least one non-precious metal, wherein:
   (i) a majority of the at least one precious metal is located at a surface of the extruded solid body;
   (ii) the at least one precious metal is carried in one or more coating layer(s) on a surface of the extruded solid body;
   (iii) at least one metal is present throughout the extruded solid body and is also present in a higher concentration at a surface of the extruded solid body;
   (iv) at least one metal is present throughout the extruded solid body and is also carried in one or more coating layer(s) on a surface of the extruded solid body; or
   (v) at least one metal is present throughout the extruded solid body, is present in a higher concentration at a surface of the extruded solid body and is also carried in one or more coating layer(s) on the surface of the extruded solid body.

2. An oxidation catalyst according to claim 1, comprising the at least one non-precious metal and wherein the at least one non-precious metal is associated with the zeolitic molecular sieve component, the non-zeolitic molecular sieve component or either or both of the zeolitic molecular sieve component and the non-zeolitic molecular sieve components in the mixture.

3. An oxidation catalyst according to claim 2, wherein the extruded solid body comprises at least one first metal associated with the zeolitic molecular sieve component, the non-zeolitic molecular sieve component or either or both of the zeolitic molecular sieve component and the non-zeolitic molecular sieve components in the mixture and at least one second metal that is not associated with the zeolitic molecular sieve component, the non-zeolitic molecular sieve component or either or both of the zeolitic molecular sieve component and the non-zeolitic molecular sieve components in the mixture.

4. An oxidation catalyst according to claim 2, wherein the or each at least one non-precious metal associated with the zeolitic molecular sieve, the non-zeolitic molecular sieve or both molecular sieves in the mixture of any two or more thereof comprise one or more metal selected from the group consisting of Fe, Cu, Ce, Hf, La, Mn, V or a mixture of any two or more thereof.

5. An oxidation catalyst according to claim 1, wherein the at least one precious metal is selected from the group consisting of Pt, Pd, Au, Ag, Ir, Ru, Rh and Os.

6. An oxidation catalyst according to claim 1, wherein:
   the at least one binder/matrix component is selected from the group consisting of a cordierite, nitrides, carbides, borides, intermetallics, lithium aluminosilicate, an optionally doped alumina, a silica source, titania, zirconia, titania-zirconia, zircon and mixtures of any two or more thereof;
   the zeolitic molecular sieve, the non-zeolitic molecular sieve or the mixture of any two or more thereof contains one or more metal; and
   the extruded body further comprises:
   0-80% by weight of a spinel; and
   0-25% by weight inorganic fibres.

7. An oxidation catalyst according to claim 1, wherein the extruded solid body consists essentially of: the at least one binder/matrix component; the zeolitic molecular sieve, the non-zeolitic molecular sieve or the mixture of any two or more thereof in an amount of 50-90% by weight; and 0-25% by weight of inorganic fibres, wherein
   the at least one binder/matrix component is selected from the group consisting of cordierite, nitrides, carbides, borides, intermetallics, lithium aluminosilicate, a spinel, an optionally doped alumina, a source of silica, titania, zirconia, titania-zirconia, zircon and mixtures of any two or more thereof.

8. An oxidation catalyst according to claim 1, wherein the extruded solid body consists essentially of: the at least one binder/matrix component; the zeolitic molecular sieve, the non-zeolitic molecular sieve or the mixture of any two or more thereof in an amount of 5-50% by weight; the optionally stabilised ceria in an amount of 20-80% by weight; and 0-25% by weight of inorganic fibres, wherein
   the at least one binder/matrix component is selected from the group consisting of cordierite, nitrides, carbides, borides, intermetallics, lithium aluminosilicate, an optionally doped alumina, a spinel, a silica source, titania, zirconia, titania-zirconia, zircon and mixtures of any two or more thereof.

9. An oxidation diesel oxidation catalyst according to claim 1 comprising an extruded solid body in the flow-through configuration, which extruded solid body consisting essentially of: the at least one binder/matrix component; the zeolitic molecular sieve, the non-zeolitic molecular sieve or the mixture of any two or more thereof in an amount of 50-81% by weight; 0-20% by weight of a source of silica; and 0-25% by weight of inorganic fibres, wherein
   the at least one binder/matrix component is selected from the group consisting of cordierite, nitrides, carbides, borides, intermetallics, lithium aluminosilicate, a spinel, an optionally doped alumina, titania, zirconia, titania-zirconia, zircon and mixtures of any two or more thereof; and the extruded solid catalyst body is coated with a first, inner layer comprising supported Pt; Pd; Au; Pt and Pd; Pd and Au; and a second, outer catalyst layer comprising supported Pt; Pd; Au; Pt and Pd; Pd and Au; and wherein where the metal(s) present is the inner layer and the outerlayer are the same, the metal loadings are different in the inner layer from the outer layer.

10. A catalyst according to claim 1 in the form of a wall-flow filter.

11. An oxidation catalyst according to claim 1, wherein the molecular sieve is the zeolitic molecular sieve or a mixture of two or more of the zeolitic molecular sieves, and has the framework type code BEA, FER, MFI or is a mixture of any two or more thereof.

12. An oxidation catalyst according to claim 1, wherein the zeolitic molecular sieve, the non-zeolitic molecular sieve or the mixture of any two or more thereof is an isomorph containing one or more substituent framework metal.

13. An oxidation catalyst according to claim 12, wherein the molecular sieve is the zeolitic molecular sieve or a mixture of two or more of the zeolitic molecular sieves, has a framework type code BEA, and includes Fe in the framework.

14. An oxidation catalyst according to claim 1, wherein the extruded body comprises the ceria and the ceria is stabilised with at least one non-cerium element to increase the thermal stability of the ceria.

15. A catalysed soot filter comprising an extruded solid body in the wall-flow filter configuration consisting essentially of: 15-70% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-20% by weight of a source of silica; 5-50% by weight of a zeolitic molecular sieve, a non-zeolitic molecular sieve or a mixture of any two or more thereof, each optionally containing one or more metal, wherein the zeolitic molecular sieve is a synthetic aluminosilicate zeolite and has a silica-to-alumina ratio of 10 to 150, and wherein the zeolitic molecular sieve is a medium pore molecular sieve, a large pore molecular sieve, or a meso pore molecular sieve; 20-80% by weight optionally stabilised ceria; and 0-20% by weight of inorganic fibres, which extruded solid catalyst body being coated with one or more layer(s) comprising supported at least one precious metal and combinations of any two or more precious metals.

16. A process for manufacturing an oxidation catalyst comprising the steps of:
forming a solid extruded body by mixing powdered starting materials of: at least one binder/matrix component or a precursor of one or more thereof; zeolitic molecular sieve, non zeolitic molecular sieve or a mixture of any two or more thereof which zeolitic molecular sieve, non-zeolitic molecular sieve or mixture of zeolitic and non-zeolitic molecular sieves being optionally associated with at least one metal; an optional optionally stabilised ceria; and an optional at least one metal compound; with optional inorganic fibers; optionally adding an organic auxiliary agent;
processing by mixing and/or kneading in an acid or alkaline aqueous solution optionally containing a metal salt of at least one metal into a plastic compound to form a mixture; extruding the mixture into a catalyst body, drying the catalyst body and calcining to form a solid extruded body;
selecting quantitative proportions of the starting materials such that the solid extruded body comprises 10-95% by weight of at least one binder/matrix component; 5-90% by weight of a zeolitic molecular sieve, a non-zeolitic molecular sieve or a mixture of any two or more thereof, wherein the zeolitic molecular sieve is a synthetic aluminosilicate zeolite and has a silica-to-alumina ratio of 10 to 150, and wherein the zeolitic molecular sieve is a medium pore molecular sieve, a large pore molecular sieve, or a meso pore molecular sieve; and 0-80% by weight optionally stabilised ceria, and optionally at least one metal and impregnating a surface of the solid extruded body with at least one precious metal and/or coating a surface of the solid extruded body with at least one coating layer(s) containing at least one precious metal.

17. A method of treating exhaust gas emissions from internal combustion engines from a stationary source or a vehicle, which method comprising contacting the exhaust gas with an oxidation catalyst according to claim 1.

18. A method according to claim 17, wherein the exhaust gas comprises at least one of HC and CO and at least one of HC and CO is oxidized upon contacting the exhaust gas with the oxidation catalyst.

19. An exhaust system for an internal combustion engine, which exhaust system comprising an oxidation catalyst according to claim 1.

20. A vehicle comprising an internal combustion engine and an exhaust system according to claim 19.

* * * * *